United States Patent [19]

Tanaka

[11] 3,991,960
[45] Nov. 16, 1976

[54] DEVICE FOR SUPPORTING ELECTRIC WIRES, CORDS AND OTHER ELONGATED BODIES

[75] Inventor: Toshie Tanaka, Machida, Japan

[73] Assignee: Nifco Inc., Tokyo, Japan

[22] Filed: Oct. 31, 1975

[21] Appl. No.: 627,581

[30] Foreign Application Priority Data
Oct. 31, 1974 Japan................ 49-131144

[52] U.S. Cl. ............... 248/68 R; 24/248 SL; 248/73; 248/74 PB
[51] Int. Cl.² ........................................ F16L 3/22
[58] Field of Search.......... 24/73 SA, 73 AP, 73 PB, 24/248 SL, 249 SL, 255 C, 255 SL; 174/40 CC, 164; 248/49, 54 R, 65, 67.7, 68, 71, 73, 74 R, 74 A, 74 B, 74 PB

[56] References Cited
UNITED STATES PATENTS

| | | | |
|---|---|---|---|
| 1,059,991 | 4/1913 | Hedges | 24/248 SL |
| 1,414,048 | 4/1922 | Schlutz | 24/248 SL |
| 2,650,948 | 9/1953 | Findlay | 248/68 R X |
| 3,126,185 | 3/1964 | Christman | 248/74 PB |
| 3,163,712 | 12/1964 | Cochran | 248/74 PB X |
| 3,409,257 | 11/1968 | Elm | 248/65 |
| 3,423,055 | 1/1969 | Fisher | 248/73 |
| 3,599,915 | 8/1971 | Soltysik | 248/74 A X |
| 3,629,912 | 12/1971 | Klopp | 24/255 SL |
| 3,637,177 | 1/1972 | Santucci | 248/74 PB |
| 3,698,681 | 10/1972 | Lacey | 24/248 SL X |

FOREIGN PATENTS OR APPLICATIONS

| | | | |
|---|---|---|---|
| 1,533,657 | 7/1968 | France | 24/255 SL |
| 1,022,820 | 3/1966 | United Kingdom | 24/73 PB |

OTHER PUBLICATIONS
Product Engineering, June 11, 1962, vol. 33, No. 12, p. 109.

Primary Examiner—Lawrence J. Staab
Attorney, Agent, or Firm—Jack R. Halvorsen; Robert W. Beart

[57] ABSTRACT

Disclosed is a device for supporting electric wires, cords and other elongated bodies, which comprises a "U"-shaped frame body having a catch provided on one free end of the frame body, a lid member hinge-connected to the other free end of the frame body and a spring member extending from the inner wall of the lid member. In use, a plurality of elongated bodies are laid on the spring member, and the lid member is pushed down until the free end of the lid member is caught by the catch of the "U"-shaped main body, thus putting the elongated bodies in the rectangle space defined by the main body and the lid member. The spring member continuously applies a force to the lid member in its opening direction as a counter action resulting from the state in which the spring member is pushed against the bottom part of the main body and is yieldingly deformed. Thus, the lid member is positively assured from undesired opening and releasing the elongated bodies.

2 Claims, 4 Drawing Figures

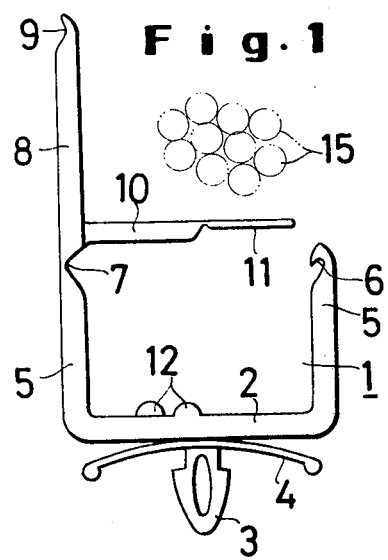
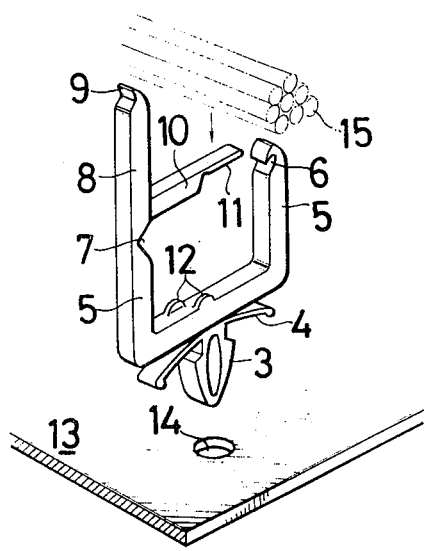
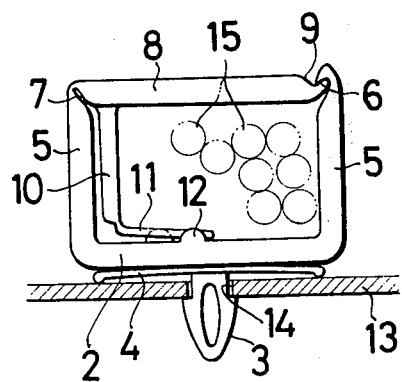
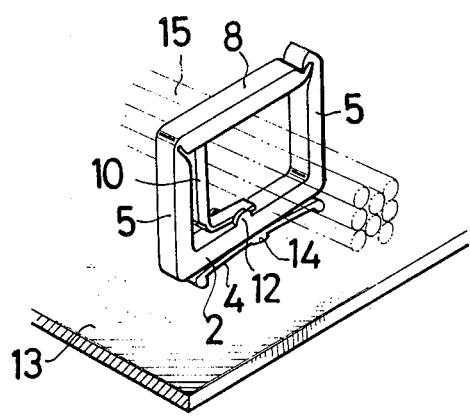

3,991,960

DEVICE FOR SUPPORTING ELECTRIC WIRES, CORDS AND OTHER ELONGATED BODIES

BACKGROUND OF THE INVENTION

This invention relates to a device for supporting electric wires, cords and other elongated bodies, and particularly to such a device which is a plastic mould comprising essentially a "U"-shaped main body and a lid member, which is adapted to close the open space of the main body to enclose a plurality of elongated bodies therein. Such supporting device has been hitherto known, and in the known device the lid member extending from one free end of the "U"-shaped main body is pushed down, and the hooked end of the lid member is caught by an associated catch of the other free end of the "U"-shaped main body, thus closing the open space of the "U"-shaped main body, and enclosing a plurality of elongated bodies in the so-closed space. This structure, however, does not assure the positive catching and holding of the lid member in its closed position, and the lid member will occasionally open to release the elongated bodies.

The object of this invention is to provide a device for supporting electric wires, cords and other elongated bodies of the type mentioned above which device assures the positive and reliable holding of the elongated bodies.

SUMMARY OF THE DISCLOSURE

To attain this object a device for supporting electric wires, cords and other elongated bodies according to this invention comprises: a "U"-shaped main body having a catch means at one free end thereof; a lid member extending from the other free end of said main body; and a spring member extending from the inner wall of said lid member, whereby when said lid member is closed, said spring member gives said lid member force in its opening direction as a counter effect caused by the state in which said spring member is pushed against the bottom part of said main body and is yieldingly deformed, thus assuring positive closure of the "U"-shaped main body and confinement of the elongated bodies.

BRIEF EXPLANATION OF THE DRAWINGS:

This invention will be better understood from the following description of a preferred embodiment which is shown in the accompanying drawings:

FIG. 1 is a front view of one embodiment according to this invention;

FIG. 2 is a perspective view of the embodiment;

FIG. 3 shows the closed position in which a plurality of elongated bodies are held in the device; and FIG. 4 is a perspective view of the same position as shown in FIG. 3.

DETAILED DESCRIPTION OF THE INVENTION:

Referring to the drawings, 1 is a "U"-shaped main body which is made from a material of elastic nature, such as a synthetic resin. An arrowhead-shaped connecting leg 3 is integrally connected to the center part of the bottom plate to the main body. A bow-shaped stay piece 4 extends from the opposite sides of the connecting leg 3. A hook 6 is provided on the end of one of the opposite legs 5 uprising from the bottom plate 2.

A lid member 8 is connected to the end of the other leg 5 of the main body 1 by a hinge portion 7. A nail 9 is provided on the free end of the lid member. The nail 9 thus provided is adapted to engage with the catch 6 of the other leg 5.

A spring member is integrally connected to the inner wall of the lid member 8. As shown in the drawings, the spring member consists of a support extension 10 and a resilient length 11. A pair of guide pieces 12 rise from the opposite sides of the bottom plate 2 of the main body.

In use, the connecting leg 3 of the main body is pushed in an aperture 14 of a panel 13, unbending the bow-shaped stay 4. When the arrowhead-shaped leg 3 is pushed in the aperture, the opposite shoulder portions of the arrowhead 3 catches the undersurface of the panel 13, and the unbent stay 4 applies a resilient force to pull the arrowhead of the connecting leg from the aperture 14 of the panel. As a result the arrowhead and the unbent stay together grip the thickness of the panel, and thus the main body 1 is positively connected to the plate 13. A plurality of elongated bodies 15 are laid on the spring member 10, and the lid member 8 is pushed and rotated around the hinge portion until the nail 9 of the free end of the lid member 8 is caught by the hook 6 of the rising leg 5, thus putting the elongated bodies in the so-closed space of the "U"-shaped main body 1. On the other hand, as best shown in FIGS. 3 and 4, the resilient length 11 is yieldingly bent, lying on the bottom part of the main body between the opposite guide pieces 12. The elastic force thus generated in the resilient length 12 will continuously apply a force to push up the lid member 8 through the support extending 10, thus positively assuring the engagement between the nail of the lid member and the hook of the rising leg of the main body. As mentioned above, the resilient length of the spring member is laid on the bottom of the main body between the opposite guide pieces, thus preventing the resilient length from turning aside from the bottom part of the main body.

Even if undesired force is applied to push and yieldingly deform the lid member in its closing position, the resilient force which is generated by the spring member to continuously apply to the lid member, will automatically return the so-deformed lid member in its original and normal position when the undesired force is removed, thus preventing the nail of the lid member from slipping off from the hook of the rising leg of the main body.

In this particular embodiment, the catch 6 is shaped in the form of a hook. A variety of catch shapes to assure positive engagement with the counter part may be used.

As is apparent from the above, when the lid member 8 is brought to its closed position, the spring member continuously applied a force to the lid member in its open direction, thus preventing the undesired opening of the lid member and the releasing of the elongated bodies from the main body.

What is claimed is:

1. A device for supporting electric wires, cords and other elongated bodies, which comprises a "U"-shaped main body including an elongated base and a pair of arms each extending perpendicularly from opposite ends of said base, one arm having a catch means at the free end thereof, a lid member hingedly connected to and extending from the free end of said other arm and adapted to extend between the free ends of said arms and engage said catch, and a spring member extending from the inner wall of said lid member facing said base, said spring member including a thick, substantially rigid portion extending substantially perpendicularly to said lid from a position adjacent to said hinge connection and having a length substantially less than said other arm and a relatively thinner portion which is brought to resiliently bear against said base when said lid member is moved to its closed position, thus giving said lid member force in its opening direction, and means to restrain said thinner portion against movement relative to said base.

2. A device according to claim 1 wherein it further comprises connecting means to fix said main body to a panel or other extensive object and said means to hold said spring member in its effective position when said lid member is brought to its closed position including at least a pair of spaced flange means rising above opposite edges of said base on the side contacted by said spring.

* * * * *